May 14, 1963 J. C. MARINACE 3,089,788

EPITAXIAL DEPOSITION OF SEMICONDUCTOR MATERIALS

Filed May 26, 1959

INVENTOR
JOHN C. MARINACE

BY William V. Schelberg
AGENT

United States Patent Office 3,089,788
Patented May 14, 1963

3,089,788

EPITAXIAL DEPOSITION OF SEMICONDUCTOR MATERIALS

John C. Marinace, Yorktown Heights, N.Y., assignor to International Business Machines Corporation, New York, N.Y., a corporation of New York Filed May 26, 1959, Ser. No. 815,956
1 Claim. (Cl. 117—227)

This invention relates to vapor deposition of semiconductor bodies and more particularly to a technique of depositing said bodies from the vapor phase by chemical reaction at a faster rate and with a greater degree of uniformity than has hitherto been achieved in the art.

In general semiconductor crystal growing may be achieved by three methods, growth from melt, growth from solution, and growth from the vapor phase. In the latter category the crystal material may be formed either directly from the vapor of the material or through an intermediate chemical reaction. Such a chemical reaction may involve the formation of a reactive intermediate decomposable by heat to produce the desired substance. For example, germanium may be prepared by the pyrolytic disproportionation of germanium diiodide onto germanium substrates as described in U.S. Patent 2,692,839.

Among the limiting parameters in the process described in the above-mentioned patent is the rate at which the deposit is formed. Another limiting factor is the degree of uniformity of the deposit onto the substrates in the deposition region.

The technique of the present invention overcomes these limitations. Specifically, it involves forcing the decomposable gaseous intermediate through the substrate or decomposition region at a high velocity. In one embodiment this result is obtained by using an elongated quartz tube having a substrate region smaller in cross section than the rest of the tube. In another embodiment, a substrate holder composed of a bulky piece of quartz is made to occupy the major fraction of the volume of the substrate region.

An object of the present invention is to provide an improved method of depositing semiconductor bodies from the vapor phase by chemical reaction.

Another object is to provide an improved method of growing semiconductor bodies by forcing a reactive chemical intermediate through a decomposition region at a high velocity.

A further object is to grow single crystal germanium bodies uniformly from the vapor phase by chemical reaction at a high deposition rate.

Still another object is to provide apparatus for carrying out the improved method.

A specific object is to provide a reaction tube for growing semiconductor bodies, said tube having a variable cross section and specifically one in which the cross section in the deposition region is smaller than that in the other regions of the tube.

Yet another object is to provide a reaction tube for carrying out the process of deposition of semiconductor bodies, said tube being of uniform cross section and having a bulky substrate holder occupying the major fraction of the decomposition region of the tube.

The foregoing and other objects, features and advantages of the invention will be apparent from the following more particular description of preferred embodiments of the invention, as illustrated in the accompanying drawings.

The present invention is based upon a discovery that the rate of growth of semiconductor bodies from the vapor phase by chemical reaction may be substantially increased by passing the chemical intermediate undergoing pyrolytic decomposition to form the semiconductor body through the decomposition region at an increased velocity. According to the present invention, the high velocity through the substrate region may be obtained by providing a reaction tube having a relatively small effective cross-section in the substrate region as compared with other regions of the tube.

Figure 1:
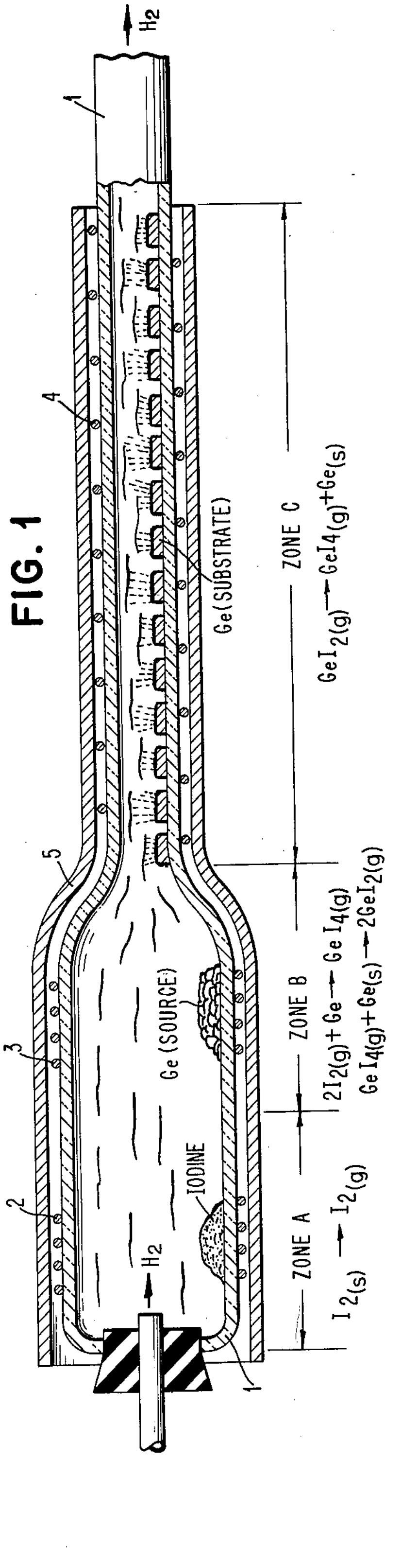
FIGURE 1 shows schematically apparatus for carrying out the technique of the present invention according to one embodiment.

Referring now to FIGURE 1 there is shown an inner quartz reaction tube 1 having three separate zones, *a*, *b*, and *c* which may be maintained at desired temperatures by heating coils 2, 3, and 4 associated therewith. An outer quartz tube 5 is provided for insulation purposes.

Figure 2:
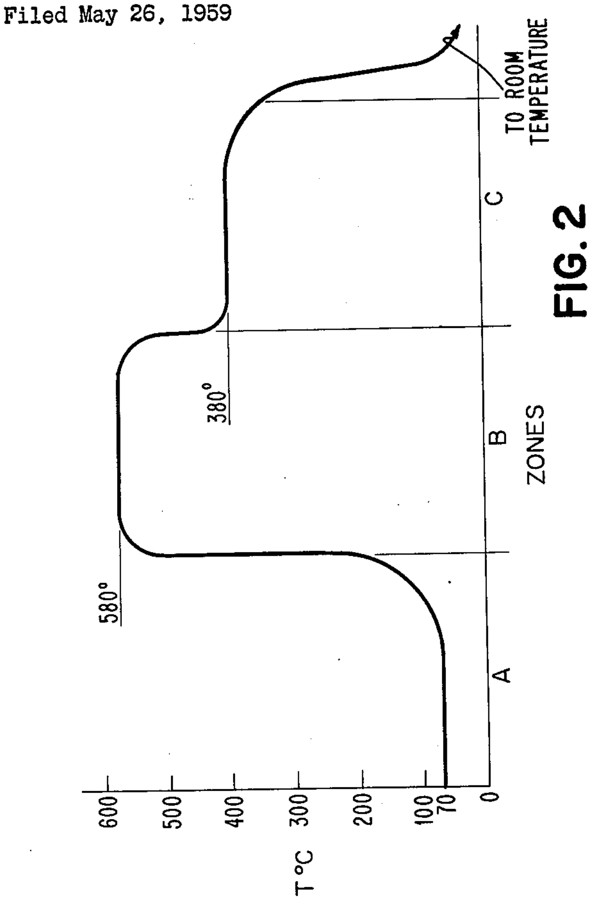
FIGURE 2 is a graph showing the temperature distribution along the reaction tube of FIGURE 1.

A preferred temperature profile along the tube is as shown in FIGURE 2. Zone *a* is maintained at a sufficient temperature for a halide vapor to be present. For solid iodine this temperature is about 80°. In zone *b* the preferred temperature is that at which the equilibrium reactions between the halide and germanium, for example, may be shifted in favor of the reactive intermediate, as for example, germanium diiodide. This temperature is about 580° C. In zone *c* it is desired to maintain a reaction temperature so that the germanium diiodide intermediate will disproportionate into solid germanium and germanium tetraiodide but no germanium iodide compound will deposit along with the germanium solid. According to the technique of the present invention it is possible to maintain the temperature in this zone at about 380° and still satisfy the requisite conditions. This temperature is some 30° lower than that used previously and further enhances the results obtained.

The overall process for the deposition of germanium bodies according to the technique of the present invention is as follows in connection with FIGURES 1 and 2. A small flow of an appropriate inert gas, such as hydrogen, is maintained throughout the reaction tube in order to insure rapid passage of gaseous materials from one part of the system to another. The hydrogen is passed over solid iodine maintained at about 70° C. in zone *a*. Thereupon iodine vapor is swept over into zone *b* where by a series of chemical reactions, with crude, source germanium at 550–600° C., the intermediate, germanium diiodide, $GeI_2$ is produced. The latter is swept into zone *c* maintained at about 380° where it pyrolytically disproportionates into germanium solid and germanium tetraiodide. The solid germanium may be collected epitaxially as single crystals on a substrate surface, as for example, on a substrate of germanium or cadmium arsenide single crystals. The $GeI_4$ gas may be collected outside of the reaction tube. The flow gas is led into a hood, burned, or recycled.

Figure 3:
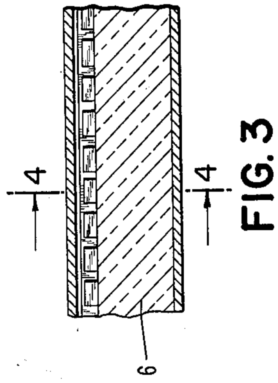
FIGURE 3 shows an elevational view of a substrate region having present therein a bulky holder.
Figure 4:
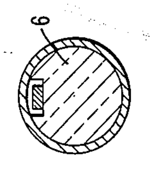
FIGURE 4 shows an end view of the apparatus of FIGURE 3.

In a typical run the effective cross section of the substrate region, i.e. that cross section open to gaseous flow, is made much smaller than the cross section of the tube in the other two zones. As shown in FIGURE 1, the decrease in effective cross section in the substrate zone may be obtained by providing a reaction tube of reduced diameter in the substrate region. Alternatively as shown in FIGURE 3, a bulky substrate holder 6 may be inserted in the substrate region of a tube of uniform diameter throughout its length.

In order to aid one skilled in the art in understanding and practicing the invention, the following specific example is provided, it being understood that the example is provided only to show a starting point for one skilled in the art and that in the light of the invention a plurality of sets of specifications may be readily visualized.

*Example*

A quartz tube of about 28 millimeters inside diameter in zones *a* and *b*, about 6 millimeters inside diameter in zone *c* and about 100 centimeters in length is loaded with an iodine charge of about 50–75 grams and about 250 grams of source germanium. A substrate wafer of germanium single crystal which has been suitably lapped and etched is provided in zone *c*. A stream of hydrogen is maintained through the tube at about 1.3 cubic feet per hour. The temperature profile along the tube is set up as shown in FIGURE 2.

During the initial part of the run, however (about 20 minutes), the substrate region is kept at about 480° C. (about 100° higher than during the main part of the run), and the source germanium at about the same temperature with the hydrogen flow rate quadrupled. Under these initial conditions the substrate surface is cleaned and etched to insure that only monocrystalline germanium surface is exposed to germanium vapor.

After an eight hour run a considerable amount of germanium is deposited. The rate of build up of the thickness of the deposited germanium is about 2.0 mils per hour. Furthermore the deposit is uniformly distributed on the substrate contained in zone *c*. On the other hand, using a reaction tube of uniform diameter, throughout its length, as commonly used heretofore in the art, a build up rate of only 0.25 mil per hour is achieved during this same time interval. Furthermore, the deposit collects only in the front portion of zone *c* on only a few substrates. The present technique therefore enables the production of many semiconductor elements at an increased rate.

Doping of the germanium may be achieved as desired by providing gaseous, thermally decomposable doping materials, such as $BCl_3$, $PCl_3$, $AsCl_3$, or $SbCl_5$ in the hydrogen stream or through a side arm leading upstream from zone *c*. For example if P type germanium is desired the boron compound may be used as an acceptor impurity. If, on the other hand, N conductivity type material is desired, arsenic or phosphorus compounds may be injected into the hydrogen stream as described.

While the invention has been described with reference to germanium diiodide, $GeI_2$, other decomposable compounds, such as the bromide, fluoride, or hydride, may be used as well. Also, the technique of the present invention may be used in a similar manner to produce semiconductor bodies of silicon and semiconductor elements having suitable PN junctions therein.

What has been described is an improved technique for growing semiconductor bodies from a vapor phase by chemical reaction. The advantages of the process described herein reside in the increased build up rate and the uniformity of deposit of the semiconductor material produced.

While the invention has been particularly shown and described with reference to preferred embodiments thereof, it will be understood by those skilled in the art that various changes in form and details may be made therein without departing from the spirit and scope of the invention.

What is claimed is:

In a method of forming germanium bodies from the vapor phase by a halide disproportionation process wherein a source of semiconductor material and a transport element are provided in one zone of a reaction container and at least one semiconductor substrate is provided in an immediately contiguous second zone of said reaction container and wherein said process said transport element reacts with said source of semiconductor material and is swept out of the firt zone by a non-oxidizing gas into said second zone where epitaxial deposition takes place upon the said at least one substrate, the improvement which comprises providing a total cross sectional area for said second zone narrower than the cross sectional area of said first zone whereby a high velocity flow of said non-oxidizing gas is created so that a superior epitaxial deposition on said at least one substrate is effected.

References Cited in the file of this patent

UNITED STATES PATENTS

| | | |
|---|---|---|
| 2,344,138 | Drummond | Mar. 14, 1944 |
| 2,692,839 | Christensen et al. | Oct. 26, 1954 |
| 2,817,311 | Nack | Dec. 24, 1957 |
| 2,831,784 | Gastinger | Apr. 22, 1958 |

FOREIGN PATENTS

| | | |
|---|---|---|
| 692,250 | Great Britain | June 3, 1953 |